(No Model.)

C. E. WEEDIN.
WAGON SEAT.

No. 576,013. Patented Jan. 26, 1897.

Witnesses
J. G. Hinkel
J. E. Hutchinson Jr.

Inventor,
Clifton E. Weedin
By J. S. Backer
his Attorney.

THE NORRIS PETERS CO., PHOTO-LITHO., WASHINGTON, D. C.

UNITED STATES PATENT OFFICE.

CLIFTON E. WEEDIN, OF BURNS, MISSOURI, ASSIGNOR OF ONE-HALF TO J. HUSTON MEADLY, OF LEBANON, MISSOURI.

WAGON-SEAT.

SPECIFICATION forming part of Letters Patent No. 576,013, dated January 26, 1897.

Application filed October 26, 1896. Serial No. 610,145. (No model.)

*To all whom it may concern:*

Be it known that I, CLIFTON E. WEEDIN, a citizen of the United States, residing at Burns, in the county of Polk and State of Missouri, have invented certain new and useful Improvements in Wagon-Seats, of which the following is a specification.

My invention has for its object to produce an improved spring-seat for wagons; and it consists of the novel combination of parts, which I will hereinafter describe.

Figure 1:
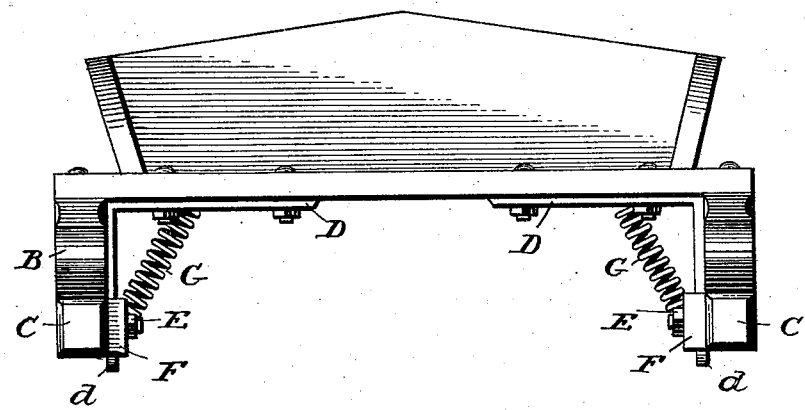
Figure 2:
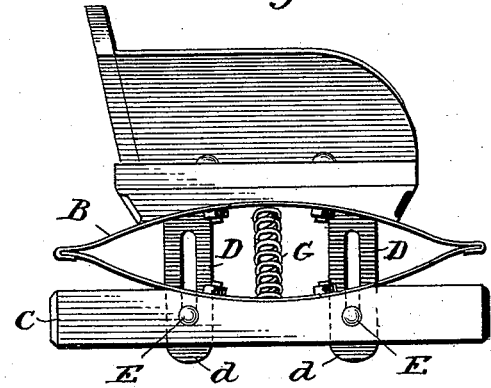
Figure 3:
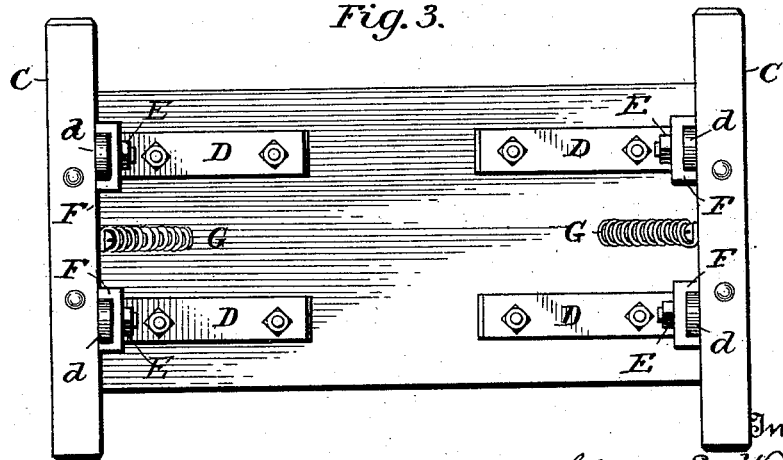

In the drawings, Figure 1 is a front view of a seat embodying my invention. Fig. 2 is an end view. Fig. 3 is an inverted plan view.

The seat, which may be of any preferred construction, is supported at its ends upon springs B B, preferably elliptical, which rest upon the spring-bars C, which in turn are adapted to be supported by the wagon-body in any suitable manner. Angular braces or guides D are secured to the under side of the seat, two at each end, and have vertically-disposed slotted legs *d*, which extend down inside of the spring-bars C. E are bolts passing through the slots in the legs *d* of the braces to limit their movements, and F are keepers which are secured to the bars C and have the legs *d* pass through them. They serve as guides for the braces and prevent any twisting or sidewise movements of the seat, thus relieving the springs B from strains which tend to break or injure them and to which they are usually subjected by the jolting and uneven movements of the wagon.

In passing over rough roads, especially when there is a light load upon the seat, there is danger that the seat will rebound or move upward so far as to injure the springs B, and to guard against this I employ the springs G, which are stiff coiled springs secured at their lower ends to the bars C and at their upper ends to the under side of the seat, the points of attachment to the seat being preferably so situated that the springs incline inward from the bars C to the seat. These springs are of such tension that they exert but little force upon the seat when carrying an ordinary load, but should the seat, in rebounding or otherwise, leave the bars C so far as to begin to injuriously strain the springs B the springs G resist such movement with rapidly-increasing force in proportion to the distance the seat moves upward, so that these springs thus prevent the rebounding of the seat, and they do so with a yielding force rather than positively, so that the seat is more pleasant to ride upon than are those which are without this part of my invention and than would be a seat which had a positive stop to limit the upward movement of the seat. By inclining the springs G, as shown, they operate to prevent sidewise movements or swaying of the seat, which is of especial advantage upon seats which are not provided with guides or braces similar to those shown at D.

The springs G may be applied to seats already constructed with end springs, especially elliptical springs, and will add greatly to their durability as well as to the comfort of those who may occupy the seats.

Having described my invention, what I claim, and desire to secure by Letters Patent, is—

1. A wagon-seat supported at its ends upon springs, in combination with two angular braces or guides, D, D, secured to the under side of the seat at each end, and having the downwardly-disposed, slotted legs, *d, d*, the bolts, E, passing through the slots in the said legs, and the keepers, F, through which the said legs pass, substantially as set forth.

2. In combination with a wagon-seat, the springs upon which it rests, and springs connected with the seat and arranged to resist the rebound of the seat under the action of its supporting-springs, substantially as set forth.

3. In combination with a wagon-seat, the springs upon which it rests, and coiled springs connected with the seat, such springs being arranged to resist the rebound or upward movement of the seat whenever it moves far enough to endanger the supporting-springs, substantially as set forth.

4. In combination with a wagon-seat, the springs upon which it rests, and the coiled springs, G, connected with the seat and extending from their connections therewith downward and outward whereby they serve both to prevent the rebound of the seat, and also sidewise or swaying movements thereof, substantially as set forth.

5. The combination, with the seat, of the elliptical springs, B, upon which it is supported, the spring-bars, the angular braces or guides, D, secured to the seat, two at each end, and having the downward-disposed, slotted legs, $d$, the bolts, E, which pass through the slots in the said legs, the keepers secured to the spring-bars, and through which the legs, $d$, of the braces pass, and the coiled springs, G, connected at their upper ends to the seat, and at their lower ends to the spring-bars, substantially as set forth.

CLIFTON E. WEEDIN.

Witnesses:
P. CUNNINGHAM,
WILLIAM BURCHETT.